United States Patent [19]

Tada et al.

[11] 4,352,899

[45] Oct. 5, 1982

[54] COATING COMPOSITION FOR METAL-SUBSTRATE

[75] Inventors: Fusao Tada, Toyonaka; Takeshi Itoh, Sakai; Joji Oka, Tokyo; Akira Okamoto, Yokohama, all of Japan

[73] Assignees: Sakai Chemical Industry Co., Ltd., Osaka; Nippon Steel Corporation, Tokyo, both of Japan

[21] Appl. No.: 250,676

[22] Filed: Apr. 3, 1981

[30] Foreign Application Priority Data

Apr. 5, 1980 [JP] Japan .................................. 55/44950
Apr. 5, 1980 [JP] Japan .................................. 55/44951

[51] Int. Cl.³ .............................................. C08L 63/00
[52] U.S. Cl. .................................... 523/451; 523/452; 523/457; 523/459
[58] Field of Search ................. 260/37 EP; 106/1.16, 106/14.44; 428/418

[56] References Cited

U.S. PATENT DOCUMENTS 3,207,611  9/1965  Ehren .............................. 106/14.44
3,408,318  10/1968  Madison ........................ 260/37 EP
3,615,730  10/1971  Law et al. ........................ 106/14.44
3,976,617  8/1976  Vasta ............................... 260/37 M
4,162,244  7/1979  Bertram ............................. 428/418

*Primary Examiner*—Lewis T. Jacobs
*Attorney, Agent, or Firm*—Wenderoth, Lind & Ponack

[57] ABSTRACT

A coating composition for a metal substrate having excellent adhesion, corrosion resistance and welding property which comprises (A) an epoxy resin, (B) an organic phosphorus compound, (C) zinc powder, of which a portion being replaceable by (E) a solid electroconductive material, and (D) a magnesium compound dispersed in a liquid medium, the weight proportion of the components (A) and (B) being from 45:55 to 95:5, the content of the component (C) corresponding to from 30 to 95% by weight based on the total weight of the non-volatile components in the composition and the content of the component (D) being from 0.1 to 5% by weight based on the total weight of the non-volatile components in the composition.

2 Claims, No Drawings

COATING COMPOSITION FOR METAL-SUBSTRATE

The present invention relates to a coating composition for a metal substrate, which can afford a coating film having excellent adhesion, corrosion resistance and welding property.

The coating composition heretofore used most frequently for the purpose of sacrificial rust-proofing is the so-called zinc-rich paint. In order to allow the zinc-rich paint to display a satisfactory sacrificial rust-proofing effect, its zinc powder content is required to be not less than 90% by weight on the basis of the total weight of the non-volatile components therein. On the other hand, however, the adhesion of the coating film resulting therefrom is deteriorated with the increase of the zinc powder content. For instance, in certain experiments, the coating film with a zinc powder content of 70% by weight does not come off under the 2T-bend test, while the one with a zinc powder content of 80% by weight comes off under the 3T-bend test, and the one with a zinc powder content of 90% by weight comes off even under the 5T-bend test. Further, in certain other experiments, a satisfactory welding property such as allowing continuous spot welding at more than 2,000 points without replacement of the electrodes can be assured when the zinc powder content is more than 85% by weight, particularly more than 90% by weight. Thus, the conventional zinc-rich paint can not maintain good adhesion with high corrosion resistance and favorable welding property.

The 2T-bend test as hereinabove stated is the test for examination of the adhesion of a coating film onto a metal substrate wherein the plate (having a coating film) to be examined is bent at an angle of 180° so as to sandwich two sheets of plates (having no coating film) of which each has the same thickness as that of the plate to be examined between the bent plate. The 3T-bend test and the 5T-bend test are performed in the same manner as above but the number of the plates to be sandwiched is respectively 3 and 5.

As the result of an extensive study, it has now been found that a coating composition comprising an epoxy resin, an organic phosphorus compound, zinc powder and a magnesium compound, optionally with a solid electroconductive material, within a certain proportion range shows excellent adhesion, corrosion resistance and welding property. This invention is based on the above finding.

The coating composition of the present invention comprises (A) an epoxy resin, (B) an organic phosphorus compound, (C) zinc powder and (D) a magnesium compound, as the essential components, dispersed in a liquid medium.

As the epoxy resin, there may be used any one conventionally employed for coating compositions, of which examples are as follows: bisphenol A-epichlorohydrin condensation products having an average molecular weight of 1,000 to 200,000, polyol type epoxy resins comprising units of alkylene oxides, polyolefin type epoxy resins comprising units of epoxypolybutadiene, novolac type epoxy resins, epoxy resins comprising units of bisphenol F, epoxy polyester resins comprising units of epoxyacrylates, epoxyurethane resins comprising urethane bonds, high molecular epoxy resins comprising units of β-methylepichlorohydrin, bisphenol A and dibasic acids, polyhydroxypolyether type, polyhydroxypolyetherester type or polyhydroxypolyester type epoxy resins obtained by methylglycidyl etherifying or methylglycidyl esterifying polyvalent carboxylic acids or polyvalent alcohols with methylepichlorohydrin, condensing the resulting products with polyvalent carboxylic acids or polyvalent phenols and further condensing the resultant products with products from glycidyl etherification or glycidyl esterification of polyvalent carboxylic acids or polyvalent alcohols with epichlorohydrin, etc. Among them, particularly preferred are blocked urethane-modified epoxy resins having an average molecular weight of 1,000 to 10,000, polyol type epoxy resins prepared from β-methylepichlorohydrin, bisphenol A and dibasic acids and having an average molecular weight of 7,000 to 50,000, epoxypolyester resins, polyhydroxypolyether type, polyhydroxypolyetherester type and polyhydroxypolyester type epoxy resins, etc. These may be admixed with small amounts of phenol resins, melamine resins, epoxypolybutadiene, etc. for the purpose of enhancement of adhesion, elasticity, etc. Depending on the kind of the epoxy resins to be used, some certain differences in adhesion and corrosion resistance are observed, and the combined use of two or more kinds of the epoxy resins may be sometimes recommended. For instance, polyol type epoxy resins comprising units of β-methylepichlorohydrin, bisphenol A and dibasic acids show relatively high corrosion resistance, and blocked urethane-modified epoxy resins exhibit comparatively strong adhesion.

As the organic phosphorus compound, there may be used any one chosen from phosphates, phosphites, phosphonates, etc., and their amine salts, polycondensates, etc. Among them, non-volatile ones which are in the state of liquid or paste at room temperature and soluble in ordinary organic solvents are preferred. In general, they are desired to be neutral, and when acidic, their neutralization with amines is favorable. Specific examples of the usable organic phosphorus compound are as follows: tris(nonylphenyl)phosphate, trixylenyl phosphate, tricresyl phosphate, trioleyl phosphate, tridodecyl phosphate, trioctyl phosphate, tris(2-ethylhexyl) phosphate, tributyl phosphate, triethyl phosphate, tris(butoxyethyl) phosphate, tris(β-chloroethyl) phosphate, tris(2,3-dichloropropyl) phosphate, tris(2,3-dibromopropyl) phosphate, tributyl thiophosphate, tridodecyl thiophosphate, trioleyl thiophosphate, etc.; tris(nonylphenyl) phosphite, trixylenyl phosphite, tricresyl phosphite, triphenyl phosphite, trioleyl phosphite, tri(tridecyl) phosphite, tridodecyl phosphite, tridecyl phosphite, tris(2-ethylhexyl) phosphite, tributyl phosphite, diphenyl decyl phosphite, phenyl didecyl phosphite, tris(nonylphenoxyethoxyethyl) phosphite, tris(butoxy)ethyl phosphite, tris[2-(2-butoxyethoxy)ethyl] phosphite, diphenyl[2-(2-ethoxyethoxy)ethyl] phosphite, tris(dipropylene glycol) phosphite, tridodecyl trithiophosphite, etc.; dibutyl butyl phosphonate, di(2-ethylhexyl) 2-ethylhexyl phosphonate, dioctyl octyl phosphonate, didodecyl dodecyl phosphonate, dioleyl oleyl phosphonate, dibutoxyethyl butoxyethyl phosphonate, etc.; mono or dioleyl phosphate, mono or didodecyl phosphate, mono or di-2-ethylhexyl phosphate, mono or di-n-butyl phosphate, mono or diisobutyl phosphate, mono or di-sec-butyl phosphate, mono or diisopropyl phosphate, mono or diethyl phosphate, etc. and their amine salts; amine salts of acidic phosphoric esters derived from alcohols obtained by addition of dodecanol or oleyl alcohol to ethylene oxide or propylene oxide;

mono or bis(nonylphenyl) phosphite, mono or diphenyl phosphite, mono or dioleyl phosphite, mono or didodecyl phosphite, mono or di(2-ethylhexyl) phosphite, mono or di-n-butyl phosphite, mono or diisobutyl phosphite, mono or di-sec-butyl phosphite, mono or diisopropyl phosphite, mono or diethyl phosphite, etc. and their neutralization products with amines; di-2-ethylhexyl hydroxymethyl phosphonate, dibutyl hydroxymethyl phosphonate, etc.; dialkyl dithiophosphates and diaryl dithiophosphates such as diisopropyl dithiophosphate, di-sec-butyl dithiophosphate, diisobutyl dithiophosphate, di-n-butyl dithiophosphate, di-2-ethylhexyl dithiophosphate, dinonylphenyl dithiophosphate, dicresyl dithiophosphate and diphenyl dithiophosphate and their amine salts; pyrophosphoric esters and polyphosphoric esters, and their amine salts; polycondensed organic phosphorus compounds such as dioleyl pentaerythritol diphosphite, tetraoleyl-4,4'-isopropylidenediphenol diphosphite, tetranonylphenyl-4,4'-isopropylidene dicyclohexyl diphosphite, diisodecylpentaerythritol diphosphite, tetraphenyldipropylene glycol diphosphite, bis(neopentylglycol) triethylene glycol diphosphite, tetrakis(nonylphenyl)polypropylene glycol diphosphite, diphenyl diisodecyl neopentyl glycol diphosphite, dineopentyl glycol propylene glycol diphosphite, dineopentyl glycol triethylene glycol diphosphite, dineopentyl glycol dipropylene glycol diphosphite, tetranonylphenyl dipropylene glycol diphosphite, tetrakis[2-(2-ethoxyethoxy)ethyl]dipropylene glycol diphosphite, tetrakis(2-phenoxyethyl)dineopentyl glycol diphosphite, tetrakis(nonylphenoxytetraethylenoxy)neopentyl glycol diphosphite, diphenyl didecyl(2,2,4-trimethyl-1,3-pentanediol) diphosphite, heptakis(dipropylene glycol) triphosphite, octaphenylpentakis(dipropylene glycol) hexaphosphite, decaphenylheptakis(dipropylene glycol) octaphosphite, decakis(nonylphenyl)heptakis(dipropylene glycol) octaphosphite, decakis(nonylphenyl)heptakis(neopentyl glycol) octaphosphite, deca-2-ethylhexylheptakis(dipropylene glycol) octaphosphite, decadodecylheptakis(dipropylene glycol) octaphosphite, diallyl phosphite, vinyl phosphonic ester, etc.; special phosphonates such as tris(dipropylene glycol)bis(hydroxymethane) diphosphonate and bis(dipropylene glycol)-α-hydroxy-β',β',β'-trichloroethane phosphonate, quaternary phosphonium compounds such as methyltrioctyl phosphonium dimethyl phosphate, etc.

As previously stated, it is generally desirable that when organic phosphorus compounds to be used are acidic, they are neutralized with amines. The amines for neutralization are not specially limited, but those in a liquid form are easy to use and preferable. Specific examples are triethylamine, monobutylamine, dibutylamine, tributylamine, 2-ethylhexylamine, n-octylamine, n-dodecylamine, t-dodecylamine, t-tridecylamine, t-tetradecylamine, coconutsamine, t-octadecylamine, t-dococylamine, oleylamine, cyclohexylamine, dicyclohexylamine, monoethanolamine, diethanolamine, triethanolamine, triisopropanolamine, aniline, dimethylaniline, diethylaniline, etc.

Among various organic phosphorus compounds, particularly preferred are phosphites, diphosphites, polyphosphites, phosphates, etc. Condensed type polyphosphites may be sometimes too viscous and produce problems on handling and in compatibility with resins. Therefore, they may be used in admixture with trialkyl phosphites, trialkyl phosphates, triaryl phosphites, triaryl phosphates, diphosphites, etc. Also, in order to prevent hydrolysis and facilitate handling, they may be used with incorporation of about 0.5 to 3% by weight of amines such as triisopropanolamine or tributylamine.

The proportion of the epoxy resin (A) and the organic phosphorus compound (B) in the coating composition of the invention may be usually from 45:55 to 95:5 by weight, preferably from 60:40 to 90:10 by weight. When the epoxy resin is used in a larger amount than the upper limit, the corrosion resistance is lowered. When used in a smaller amount than the lower limit, the adhesion is deteriorated. The reason why the combined used of the epoxy resin and the organic phosphorus compound in the said proportion can produce much more excellent adhesion and corrosion resistance than the sole use of the epoxy resin is still uncertain, but it may be presumed that the organic phosphorus compound serves as a curing agent and/or a curing accelerator for the epoxy resin so as to form an extremely tough coating film. This presumption may be supported by the fact that in case of the sole use of the epoxy resin, baking at about 280° C. is essential for achievement of good adhesion and corrosion resistance, while in case of the combined used of the epoxy resin with the organic phosphorus compound, satisfactory adhesion and corrosion resistance are obtainable by baking at a lower temperature around 240° to 260° C.

Still, a portion (e.g. up to 20% by weight) of the epoxy resin may be replaced by an amine-formaldehyde resin, a phenol-formaldehyde resin, a polyamide resin, an alkyl etherified methylolamine resin, an urea resin, a blocked isocyanate-modified resin or the like insofar as the substantial decrease of adhesion, corrosion resistance and/or welding property is not produced.

As the zinc powder, there may be used the one in a globular or flake form, which is employed for conventional coating compositions, and the use of a globular one is particularly preferred from the viewpoints of adhesion and welding property. In case of a globular one, the particle size may be usually from about 1 to 15μ, preferably from about 3 to 7μ. In case of a flake one, the particle size (longer axis) may be from about 1 to 15μ, preferably from about 2 to 10μ. It is of course possible to use the ones having different shapes and particle sizes in mixture. The amount of the zinc powder (C) in the coating composition of the invention may be from 30 to 95% by weight on the total weight of the non-volatile components in such composition. When the electroconductive material as the optional component is not included in the composition, the content of the zinc powder may be usually from 70 to 95% by weight, preferably from 75 to 90% by weight, on the basis of the total weight of the non-volatile components. In case of the content being smaller than the lower limit, the welding property may be somewhat deteriorated. In case of the content being larger than the upper limit, the adhesion may be somewhat decreased. By the use of the electroconductive material, the content of the zinc powder can be lowered up to 30% by weight. For assuring sufficient adhesion, corrosion resistance and welding property, the zinc powder content on the combined use of the electroconductive material may be preferably from 50 to 95% by weight on the basis of the total weight of the non-volatile components.

As the magnesium compound, there may be used powders of metallic magnesium, magnesium oxide, magnesium hydroxide, magnesium sulfate, magnesium chloride, magnesium silicate, magnesium carbonate, basic magnesium carbonate, magnesium borate, magnesium phosphate, magnesium silicofluoride, magnesium oxalate, magnesium acetate, magnesium formate, magnesium citrate, etc. Among them, the use of magnesium oxide, particularly calcined at a temperature of not higher than 1000° C., is preferred. The amount of the magnesium compound (D) in the composition may be usually from about 0.1 to 5% by weight, preferably from about 0.2 to 2% by weight, on the basis of the total weight of the non-volatile components. When the amount is less than 0.1% by weight, no effect of addition is manifested. When the amount exceeds 5% by weight, the welding property is rather deteriorated. The particle size of the powders of the magnesium compound may be usually such as passing through a 100 mesh sieve, preferably through a 300 mesh sieve.

The use of the magnesium compound in the composition of the invention is quite effective in enhancement of the corrosion resistance. Such effect is much larger in the system including the organic phosphorus compound than in the system not including the organic phosphorus compound. Further, the enhancement of the corrosion resistance achieved by the combined use of the organic phoshorus compound and the magnesium compound is synergistic in comparison with that achieved by the sole use of any of them.

The coating composition of the present invention may comprise as an optical component a solid electroconductive material, of which examples include powders of iron, nickel, cobalt, manganese, chromium, etc. and their alloys, and powders of carbides of titanium, zirconium, hafnium, vanadium, niobium, tantalm, chromium, tungsten, molybdenum, etc. Suitable particle size of these particles is such as passing through a 100 mesh sieve, preferably through a 300 mesh sieve. Since the electroconductive material (E) is to be used as a substitute for the zinc powder (C) for modifying the adhesion as well as the welding property, the amount of the electroconductive material (E) may be such that the combined weight of the zinc powder as the component (C) and the electroconductive material as the component (E) is from 30 to 95% by weight on the basis of the total weight of the non-volatile components in the composition, provided that the amount of the components (E) is not more than 3 parts by weight to one part by weight of the component (C).

The coating composition may further comprise powders of aluminum, graphite, carbon, etc. for improvement of the electroconductivity of the resulting coating film. Moreover, it may contain chromate pigments (e.g. zinc chromate (ZPC type), zinc tetraoxy chromate (ZPO type), basic lead chromate, strontium chromate), calcium plumbate, micaceous iron oxide, boron oxide, barium methaborate, calcium oxide, aluminium oxide, uranium acetate, calcium molybdenate, zinc molybdenate, zinc tungustate, calcium tungstate, calcium borosilicate, etc. for enhancement of the corrosion resistance. These may be usually employed in an amount of about 0.1 to 1.0% by weight on the basis of the total weight of the non-volatile components. However, the chromate pigments may be incorporated up to a content of about 5% by weight.

The said essential and optional components are dispersed in an appropriate liquid medium such as cyclohexanone, ethyl cellosolve, butyl cellosolve, n-butanol, ethyl acetate, toluene, xylene or methyl isobutyl ketone to make the coating composition of the invention. In general, the epoxy resin is provided in the form of solution in the said liquid medium in a concentration of 30 to 50% by weight, and therefore it is not necessarily required to use any further liquid medium. When desired, however, a suitable solvent such as xylene, toluene, mineral terpene, methyl ethyl ketone, methyl isobutyl ketone, ethyl cellosolve, butyl cellosolve, cellosolve acetate, ethyl acetate, butyl acetate, methyl isobutyl carbinol, isopropanol, n-butanol or cyclohexanone may be used so as to adjust an appropriate viscosity convenient for handling. Usually, the content of the non-volatile components in the coating composition of the invention may be from about 30 to 90% by weight on the basis of the weight of the composition, although is is varied with the application manner of the composition onto a metal substrate.

The dispersion may be accomplished by a per se conventional mixing procedure, for instance, high speed agitation using a homomixer or a dispermill. Grinders, ball mills, etc. are also usable for attaining a good dispersion state.

For application of the composition of the invention onto a metal substrate, a per se known application procedure such as spraying, dipping, brushing, rolling or curtain flowing may be adopted. The application is usually made so as to form a coating layer having a thickness of 5 to $20\mu$, preferably of 8 to $15\mu$ after baking. When the thickness is less than $5\mu$, the corrosion resistance becomes inferior, and when it exceeds $20\mu$, adhesion and welding property may be deteriorated. After the application, baking is usually effected at a temperature of 200° to 300° C. for a period of several ten seconds to several minutes.

The metal substrate suitable for application of the coating composition of the invention is iron, particularly steel made by hot or cold rolling. Steel plated with zinc, zinc alloy, aluminum, aluminum alloy, chromium, chromium-chromic oxide, nickel, etc., aluminum, zinc and their alloy materials are also usable as the metal substrate. It is desirable for them to be used after the surface adjustments such as blast treatment, degreasing, pickling, etc. or with chromate treatment, phosphate treatment, and other chemical conversion treatment.

The coating film thus formed on the metal substrate shows excellent corrosion resistance. It is also excellent in adhesion on processing and welding property. It is notable that such coating film has a good adaptability to a coating film which may be provided thereon. Thus, various other resinous paints comprising polyvinyl chloride resins, epoxy resins, acrylic resins, melamine alkyd resins or polyester melamine resins may be applied thereon.

Practical and preferred embodiments of the present invention are illustratively shown in the following Examples, wherein "part(s)", "%" and ratios are by weight. Still, the coating film thickness was measured by the use of electromagnetic microthickness gauge (manufactured by KET Scientific Research Institute).

EXAMPLES 1 TO 6

The components and the amounts shown in Table 1 were respectively taken in a 100 ml broad-necked glass bottle, to which a solvent mixture of xylene, butyl, cellosolve, butanol and cyclohexanone (1:1:1:1) (40 parts) and glass beads of 3 mm in diameter (20 parts) were added, and the resultant mixture was dispersed with a paint mill (manufactured by Toyo Seiki Seisakusho Ltd.) for 10 minutes. Thereafter, the glass beads were removed to obtain a coating composition.

The coating composition was applied to a cold rolled steel plate (JIS G 3141, SPCC-D) previously subjected to iron phosphate treatment by the use of a bar coater. The resultant plate was baked at a temperature of 230° C. for 3 minutes to obtain a coating film having a thickness of about 12μ. The coating film was subjected to various tests.

COMPARATIVE EXAMPLES 1 TO 5

The components and the amounts shown in Table 1 were taken respectively in a 100 ml broad-necked glass bottle, to which the solvent and the glass beads as in Examples 1 to 6 were added, and operation was made in entirely the same manner as in Examples 1 to 6 to obtain a coating film, which was subjected to various test.

TABLE 2

|  | Adhesion*1 | | Corrosion resistance |
|---|---|---|---|
|  | 2T | 4T | (hours) |
| Example |  |  |  |
| 1 | ⊚ | ⊚ | 312 |
| 2 | ⊚ | ⊚ | 360 |
| 3 | ⊚ | ⊚ | 432 |
| 4 | ○ | ○~⊚ | 456 |
| 5 | ⊚ | ⊚ | 360 |
| 6 | ⊚ | ⊚ | 312 |
| Comparative Example |  |  |  |
| 1 | ⊚ | ⊚ | 120 |
| 2 | ○~Δ | ⊚ | 16 |
| 3 | ○~Δ | ⊚~○ | 24 |
| 4 | X | Δ | 168 |
| 5 | ⊚ | ⊚ | 120 |

Note:
*1Evaluation on the adhesion was made according to the following criteria:
⊚: Scarce peeling off noticed
○: Slight peeling off noticed
Δ: Considerable peeling off noticed
X: Remarkable peeling off noticed

TABLE 1*1

|  | Epoxy resin*2 (part(s)) | Organic phosphorus compound*3 (part(s)) | Zinc*4 powder (part(s)) | Electro-*5 conductive material (part(s)) | Magnesium*6 compound (part(s)) |
|---|---|---|---|---|---|
| Example 1 | EPICLON P-439 (10.2) | Diphenylnonylphenyl phosphite (1.1) Decaphenylheptakis(dipropylene glycol)-octaphosphite (1.1) t-Dodecylamine salt of bis(2-ethylhexyl)-phosphate (1.1) | 86 | — | Magnesium oxide (0.5) |
| 2 | EPICLON P-439 (18) EPICLON H-353 (1) EPOKEY 834 (2) | Diphenylnonylphenyl phosphite (3) Decaphenylheptakis(dipropylene glycol)-octaphosphite (2.7) t-Dodecylamine salt of bis(2-ethylhexyl)-phosphate (2.7) | 30 | SUS 430 (40) | Magnesium oxide (0.6) |
| 3 | EPICLON P-439 (10) | Diphenylnonylphenyl phosphite (0.9) Decaphenylheptakis(dipropylene glycol)-octaphosphite (0.8) t-Dodecylamine salt of bis(2-ethylhexyl)-phosphate (0.8) | 86 | — | Magnesium oxide (1.5) |
| 4 | EPICLON P-439 (2.8) EPOKEY 834 (1) | Phenyldiisodecyl phosphite (1) | 95 | — | Magnesium oxide (0.2) |
| 5 | EPICLON P-439 (22.6) | Diphenylnonylphenyl phosphite (7) | 60 | Titanium carbide (10) | Magnesium oxide (0.4) |
| 6 | EPICLON P-439 (10.2) | Diphenylnonylphenylphosphite (1.1) Decaphenylheptakis(dipropylene glycol)-octaphosphite (1.1) t-Dodecylamine salt of bis(2-ethylhexyl)-phosphate (1.1) | 86 | — | Basic magnesium carbonate (0.5) |
| Comparative Example 1 | EPICLON P-439 (10.4) | Diphenylnonylphenyl phosphite (1.2) Decaphenylheptakis(dipropylene glycol)-octaphosphite (1.2) t-Dodecylamine salt of bis(2-ethylhexyl)-phosphate (1.2) | 86 | — | — |
| 2 | EPICLON P-439 (14) | — | 86 | — | — |
| 3 | EPICLON P-439 (13.5) | — | 86 | — | Magnesium oxide (0.5) |
| 4 | EPICLON P-439 (3.5) EPOKEY 834 (1.3) | — | 95 | — | Magnesium oxide (0.2) |
| 5 | EPICLON P-439 (23) | Diphenylnonylphenyl phosphite (7) | 60 | Titanium carbide (10) | — |

Notes:
*1The numeral in parenthesis indicates the weight (parts by weight) in 100 parts by weight of the coating film.
*2"EPICLON P-439", polyol type epoxy resin manufactured by Dainippon Ink and Chemicals., Inc., average molecular weight 10,000; "EPICLON H-353", polyol type epoxy resin manufactured by Dainippon Ink and Chemicals, Inc., average molecular weight 10,000; "EPOKEY 834", blocked urethane-modified epoxy resin manufactured by Mitsui Toatsu Chemicals, Inc., average molecular weight 4,000.
*3The phosphorus contents of the organic phosphorus compounds are as follows: diphenylnonylphenyl phosphite, 7.1%; decaphenylheptakis(dipropylene glycol)octaphosphite, 11.8%; t-dodecylamine salt of bis(2-ethylhexyl)phosphate, 6.5%; phenyldiisodecyl phosphite, 7.1%.
*4Globular, 4 to 5 μ in average particle size.
*5Passing through a 300 mesh sieve.
*6Passing through a 325 mesh sieve.

TEST EXAMPLE 1

Regarding the coating films obtained in Examples 1 to 6 and Comparative Examples 1 to 5, the adhesion and the corrosion-resistance were tested, and the results are shown in Table 2. As for the adhesion, comparison of performances was effected by the 2T bend test and the 4T bend test, and for the corrosion resistance, comparison was made on the time until red rust was formed on the cross-cut portions under the salt spray test (JIS Z 2371).

As the result of the welding test effected on the coating films obtained in Examples 2 and 5 as well as Comparative Example 5, it was found that the continuous welding of 2,000 points was possible and the welding property was not deteriorated at all.

EXAMPLE 7

"EPICLON P-439" (polyol type epoxy resin manufactured by Dainippon Ink and Chemicals, Inc.; average molecular weight 10,000) (resin content 40%; 50 parts) and phenyldiisodecyl phosphite (phosphorus content 7.1%; 3 parts) were combined with a solvent mixture of xylene, butyl cellosolve and butanol (1:1:1) (7.5 parts). The thus obtained composition (37.5 parts) and globular zinc powder (average particle size 4–5μ; 85 parts) were taken into a 100 ml broad-necked glass bottle, glass beads of 3 mm in diameter (20 parts) were added thereto, and the resultant mixture was dispersed with a paint mill (manufactured by Toyo Seiki Seisakusho Ltd.) for 10 minutes. Thereafter, the glass beads were removed to make a coating composition.

The coating composition was applied to a cold rolled steel plate (150×70×0.6 mm; JIS G 3141, SPCC-D), previously subjected to degreasing treatment with trichlene, by the use of a No. 20 bar coater, and the plate was baked for 3 minutes in an oven kept at a constant temperature of 250° C. to form a coating film having a thickness of 12μ.

EXAMPLE 8

"EPICLON P-439" as used in Example 1 (resin content 40%; 63.8 parts), "EPICLON H-353" (polyol type epoxy resin manufactured by Dainippon Ink and Chemicals, Inc.; average molecular weight 10,000) (resin content 40%; 3.8 parts) and "EPOKEY 834" (blocked urethane-modified epoxy resin manufactured by Mitsui Toatsu Chemicals, Inc.; average molecular weight 4,000) (resin content 40%; 7.5 parts) were mixed to obtain a resin mixture.

To the resin mixture, there was added a mixture of decaphenylheptakis(dipropylene glycol) octaphosphite (phosphorus content 11.8%; 5 parts), tributyl phosphite (phosphorus content 11.6%; 5 parts) in a solvent mixture of xylene, butyl cellosolve, cellosolve acetate, butanol and cyclohexanone (3:2:2:2:1) (15 parts) (hereinafter referred to as "phosphorus compound mixture") to obtain a composition.

The thus obtained composition (35 parts) and globular zinc powder (average particle size 4–5μ; 86 parts) were taken into a 100 ml broad-necked glass bottle and glass beads of 3 mm in diameter (20 parts) were added therein, and the resultant mixture was dispersed with a paint mill (manufactured by Toyo Seiki Seisakusho Ltd.) for 10 minutes. Thereafter, the glass beads were removed to make a coating composition.

The coating composition was applied to the cold rolled steel plate (150×70×0.8 mm; JIS G 3141, SPCC-D), previously subjected to iron phosphate treatment with "BONDERITE 1077" (manufactured by Nippon Parkerizing Co., Ltd.), by the use of a No. 20 bar coater, and the plate was baked for 3 minutes in an oven kept at a constant temperature of 250° C. to form a coating film having a thickness of 13μ.

EXAMPLE 9

In the same manner as in Example 8, the resin mixture (95 parts) and the phosphorus compound mixture (5 parts) were mixed to prepare a composition. The composition (35 parts) and zinc powder (86 parts) were mixed together to make a coating composition. The coating composition was applied to a cold rolled steel plate, followed by baking to form a coating film having a thickness of 13μ.

EXAMPLE 10

In the same manner as in Example 8, the resin mixture (60 parts) and the phosphorus compound mixture (40 parts) were mixed to prepare a composition. The composition (35 parts) and zinc powder (86 parts) were mixed together to make a coating composition. The coating composition was applied to a cold rolled steel plate, followed by baking to form a coating film having a thickness of 13μ.

EXAMPLE 11

In the same manner as in Example 8, the resin mixture (45 parts) and the phosphorus compound mixture (55 parts) were mixed to prepare a composition. The composition (35 parts) and zinc powder (86 parts) were mixed together to form a coating composition. The coating composition was applied to a cold rolled steel plate, followed by baking to form a coating film having a thickness of 13μ.

EXAMPLE 12

"EPICLON EXA-445" (polyol type epoxy resin, manufactured by Dainippon Ink and Chemicals, Inc.) (resin content 36%; 23.6 parts), "EPICLON H-353" as used in Example 8 (resin content 40%; 2.5 parts) and "PLYOPHEN TD-447" (phenol resin manufactured by Dainippon Ink and Chemicals, Inc.) (resin content 60%; 0.83 part) were mixed to obtain a resin mixture.

To the resin mixture, there was added a mixture of t-dodecylamine salt of bis(2-ethylhexyl) phosphate (phosphorus content 6.5%; 1.43 parts), diphenylnonylphenyl phosphite (phosphorus content 7.1%; 1.43 parts) and mono-2,3-dichloropropylbis(2,3-dibromopropyl) phosphate (phosphorus content 5.1%; 1.43 parts) in a solvent mixture of xylene, butyl cellosolve, butanol, methyl isobutyl ketone and cyclohexanone (2:1:1:1:1) (9.59 parts) to obtain a composition (40.81 parts).

The thus obtained composition (25.71 parts) and zinc powder (91 parts) as used in Example 8 were mixed together in the same manner as in Example 8 to make a coating composition.

The coating composition was applied to a cold rolled steel plate, followed by baking at 300° C. for 45 seconds to form a coating film having a thickness of 14μ.

EXAMPLE 13

"EPICLON H-157" (polyol type epoxy resin manufactured by Dainippon Ink and Chemicals Inc.; average molecular weight 10,000) (resin content 40%; 93.8 parts), "EPICLON H-353" (resin content 40%; 25.0 parts) as used in Example 8 and "HITANOL 4010" (phenol resin manufactured by Hitachi Chemical Co., Ltd.) (resin content 50%; 5.0 parts) were mixed to obtain a resin mixture.

To the resin mixture, there was added a mixture of diphenylnonylphenyl phosphite (phosphorus content 7.1%; 10 parts), tris(nonylphenyl) phosphite (phosphorus content 4.1%; 2.5 parts) in a solvent mixture of toluene, methyl isobutyl ketone, butanol and cyclohexanone (1:1:1:1) (20 parts) to obtain a composition (156.3 parts).

The thus obtained composition (32.5 parts), zinc powder (80 parts) as used in Example 8 and zinc flake in a paste form (zinc content 78% in xylene; 9 parts) were mixed together in the same manner as in Example 8 to make a coating composition.

The coating composition was applied to a cold rolled steel plate (150×70×0.8 mm; JIS G 3141, SPCC-B), previously subjected to degreasing treatment with trichlene, by the use of a No. 18 bar coater, and the plate was baked in an oven kept at a constant temperature of 280° C. for 2 minutes to form a coating film having a thickness of 13μ.

EXAMPLE 14

"EPICLON P-439" (resin content 40%; 100 parts) as used in Example 7, "EPICLON H-353" (resin content 40%; 12.5 parts) as used in Example 8 and "CF-11A" (epoxidated 1,2-polybutadiene manufactured by Asahi Denka Kogyo K.K.) (resin content 100%; 5 parts) were mixed to obtain a resin mixture.

To the resin mixture, there was added a mixture of t-dodecylamine salt of bis(2-etylhexyl) dithiophosphate (phosphorus content 6.3%; 16.7 parts), heptaphenyltetrakis(dipropylene glycol) pentaphosphite (phosphorus content 11.6%; 16.7 parts) and decakis(nonylphenyl)heptakis(dipropylene glycol) octaphosphite (phosphorus content 11.1%; 16.7 parts) in a solvent mixture of xylene, butyl cellosolve, butanol, methyl isobutyl ketone and cyclohexanone (1:1:1:1:1) (82.5 parts) to obtain a composition.

The thus obtained composition (50 parts) and zinc flake (average size 12μ; zinc content 94% and graphite content 6%; 85 parts) were treated in the same manner as in Example 8 to make a coating composition.

The coating composition was applied to a cold rolled steel plate (150×70×0.8 mm; JIS G 3141, SPCC-D), previously subjected to chromic acid treatment with "ACCOMET C" (manufactured by Kansai Paint Co., Ltd.), by the use of a bar coater, and the plate was baked in an oven kept at a constant temperature of 250° C. for 4 minutes to form a coating film having a thickness of 13μ.

EXAMPLE 15

"EPOKEY 830" (blocked urethane-modified epoxy resin manufactured by Mitsui Toatsu Chemicals Inc.; average molecular weight 4,000) (resin content 40%; 75 parts), "EPOKEY 834" (resin content 40%; 75 parts) as used in Example 8, "EPICLON H-353" (resin content 40%; 87.5 parts) as used in Example 8 and "POLYOPHEN TD-447" (resin content 60%; 8.3 parts) as used in Example 12 were mixed to obtain a resin mixture.

To the resin mixture, there were added a mixture of decakis(nonylphenyl)heptakis(dipropylene glycol) octaphosphite (phosphorus content 11.1%; 4 parts), tris-cresyl phosphate (phosphorus content 8.4%; 4 parts) and t-dodecylamine salt of mono-2-ethylhexyl phosphite (phosphorus content 7.9%; 2parts) in a solvent mixture of xylene, methyl isobutyl ketone, cellosolve acetate, butanol and cyclohexanone (2:1:1:1:1) (21 parts) to obtain a composition.

The thus obtained composition (37.5 parts) and globular zinc powder (average particle size 4μ; 85 parts) were mixed together to make a coating composition.

The coating composition was applied to a cold rolled steel plate, followed by baking to form a coating film having a thickness of 13μ.

EXAMPLE 16

"ADEKA RESIN EPX 25-10" (epoxy resin manufactured by Asahi Denka Kogyo K.K.) (resin content 50%; 68.2 parts), "EPICLON H-353" as used in Example 8 (resin content 40%; 25 parts), "ADEKA HARDNER EHX-127-60S" (epoxy resin hardening agent manufactured by Asahi Denka Kogyo K.K.) (resin content 60%; 5.7 parts) and "PLYOPHEN TD-447" as used in Example 8 (resin content 60%; 4.2 parts) were mixed to obtain a resin mixture.

To the resin mixture, there was added a mixture of decaphenylheptakis(dipropylene glycol) octaphosphite (phosphorus content 11.8%; 3.75 parts), tris(phenoxyethyl)phosphite (phosphorus content 7.1%; 3.75 parts) and the salt of isodecyl acid phosphate (diester/monoester=1/1.05) with t-dodecylamine (1.1 equivalent to the strong acid number) (phosphorus content 5.1%; 7.5 parts) in a solvent mixture of xylene, methylisobutyl ketone, cellosolve acetate and cyclohexanone (1:1:1:1) (18.8 parts) to obtain a composition.

The thus obtained composition (26.7 parts) and zinc powder as used in Example 8 (88 parts) were mixed together to make a coating composition, which was then applied to a steel plate and baked at 220° C. for 12 minutes to form a coating film.

EXAMPLE 17

"EPICLON H-157" as used in Example 13 (resin content 40%; 47.5 parts), "HITANOL 4010" as used in Example 13 (resin content 50%; 2 parts) and a mixture of decaphenylheptakis(dipropylene glycol) octaphosphite (phosphorus content 11.8%; 4.3 parts), diphenylnonylphenyl phosphite (phosphorus content 7.1%; 4.3 parts) and dinonylphenyl pentaerythritol diphosphite (phosphorus content 9.8%; 2.2 parts) were mixed in a solvent mixture of toluene, methyl isobutyl ketone, butanol and cyclohexanone (1:1:1:1) (16.7 parts) to obtain a composition.

The thus obtained composition (35 parts) and zinc powder as used in Example 15 (86 parts) were mixed together to make a coating composition, which was then applied to a steel plate and baked to form a coating film having a thickness of 13μ.

EXAMPLE 18

"EPICLON EXA-192" (polyol type epoxy resin manufactured by Dainippon Ink and Chemicals Inc.; average molecular weight 30,000) (resin content 40%; 40 parts), "EPICLON H-353" as used in Example 8 (resin content 40%; 7.5 parts) and "PLYOPHEN TD-447" as used in Example 12 (resin content 60%; 1.7 parts) were mixed to obtain a resin mixture.

To the resin mixture, there was added a mixture of tris(dipropylene glycol) phosphite (phosphorus content 7.2%; 2 parts), tetraphenyl dipropylene glycol diphosphite (phosphorus content 10.9%; 2 parts) and decakis(nonylphenyl)heptakis(neopentyl glycol) octaphosphite (phosphorus content 7.9%; 2 parts) in a solvent mixture of xylene, methyl isobutyl ketone and cyclohexanone (1:1:1) (9.8 parts) to obtain a composition.

The thus obtained composition (35 parts) and zinc powder as used in Example 15 (86 parts) were mixed together to make a coating composition, which was then applied to a steel plate and baked to form a coating film having a thickness of 13μ.

EXAMPLE 19

"EPICLON EXA-445" as used in Example 12 (resin content 36%; 47.2 parts), "EPICLON H-353" as used in Example 8 (resin content 40%; 2.5 parts) and "EPOKEY 834" as used in Example 8 (resin content 40%; 5.0 parts) were mixed to obtain a resin mixture.

To the resin mixture, there was added a mixture of decaphenylheptakis(dipropylene glycol) octaphosphite (phosphorus content 11.8%; 2 parts), tris(nonylphenoxyethoxyethyl) phosphite (phosphorus content 3.2%; 2 parts) and hydroxymethyl phosphonic acid bis(2-ethylhexyl)ester (phosphorus content 9.1%; 1 part) in a solvent mixture of xylene, methyl isobutyl ketone, cyclohexanone, collosolve acetate and butanol (1:1:1:1:1) (2.8 parts) to obtain a composition.

The thus obtained composition (17.5 parts) and zinc powder as used in Example 15 (93 parts) were mixed together as in Example 8 to make a coating composition, which was then baked to form a coating film having a thickness of 13μ.

EXAMPLE 20

To a resin mixture comprising "EPICLON P-439" as used in Example 7 (resin content 40%; 69.7 parts) and "EPICLON H-353" as used in Example 8 (resin content 40%; 5.3 parts), there was added a mixture of tetranonylphenyl-4,4'-isopropylidene dicyclohexyl diphosphite (phosphorus content 5.3%; 3.4 parts) and tris[2-(2-butoxyethoxy)ethyl]phosphite (phosphorus content 5.0%; 3.3 parts) in a solvent mixture of xylene, butyl cellosolve, butanol and cyclohexanone (1:1:1:1) (15 parts) to obtain a composition.

The thus obtained composition (55 parts) and zinc flake containing aluminum (zinc content 67.5% and aluminum content 7.5% in xylene; average size 3μ; 104 parts) were mixed together to make a coating composition, which was then baked at 250° C. for 3 minutes to form a coating film having a thickness of 13μ.

EXAMPLE 21

To "EPICLON P-439" (resin content 40%; 46.5 parts), there was added a mixture comprising deca-2-ethylhexylheptakis(dipropylene glycol) octaphosphite (phosphorus content 10.6%; 5.3 parts), trixylenyl phosphate (phosphorus content 7.5%; 5.3 parts) and tetrakis(nonylphenyl) dipropylene glycol diphosphite (phosphorus content 5.5%; 2.7 parts) in a solvent mixture of xylene, butyl cellosolve and butanol (1:1:1) (20 parts) to obtain a composition.

The thus obtained composition (30 parts), ZPC type zind chromate (0.2 part) and zinc powder as used in Example 15 (87.8 parts) were mixed together to make a coating composition, which was then applied to a steel plate and baked to form a coating film.

EXAMPLE 22

"EPICLON P-439" as used in Example 7 (resin content 40%; 69.7 parts), "EPICLON H-353" as used in Example 8 (resin content 40%; 5.3 parts) and triphenyl phosphite containing a 1% isopropanolamine (phosphorus content 9.9%; 7.5 parts) were combined with a solvent mixture of xylene, butyl cellosolve, butanol and cyclohexanone (1:1:1:1) (18.75 parts) to obtain a composition. The composition (37.5 parts) and zinc powder as used in Example 8 (85 parts) were mixed together to make a coating composition, which was then applied to a steel plate and baked to form a coating film.

EXAMPLE 23

The composition containing resins and organic phosphorus compounds as prepared in Example 8 (75 parts), zinc powder as used in Example 8 (20 parts) and iron powder passed through a 325 mesh sieve (50 parts) were mixed together in the same manner as in Example 8 to make a coating composition, which was then applied to a steel plate and baked to form a coating film having a thickness of 13μ.

EXAMPLE 24

The composition containing resins and organic phosphorus compounds as prepared in Example 8 (70 parts), zinc powder as used in Example 8 (68 parts) and titanium carbide passed through a 500 mesh sieve (4 parts) were mixed together in the same manner as in Example 8 to make a coating composition, which was then applied to a steel plate and baked to form a coating film having a thickness of 13μ.

COMPARATIVE EXAMPLE 6

The resin mixture as used in Example 8 (35 parts) and zinc powder as used in Example 8 (86 parts) were mixed together to make a coating composition, which was then applied to a steel plate and baked to form a coating film having a thickness of 13μ.

COMPARATIVE EXAMPLE 7

"EPICLON EXA-445" as used in Example 21 (resin content 36%; 47.2 parts), "EPICLON H-353" as used in Example 8 (resin content 40%; 5 parts) and "PLYOPHEN TD-447" as used in Example 12 (resin content 60%; 1.66 parts) were combined with a solvent mixture of xylene, butyl cellosolve, butanol, methyl isobutyl ketone and cyclohexanone (2:1:1:1:1) (3.25 parts) to obtain a resin mixture.

To the resin mixture (25.71 parts), zinc powder as used in Example 12 (91 parts) was added, and the resultant mixture was treated as in Example 12 to make a coating composition, which was then applied to a steel plate to form a coating film having a thickness of 12μ.

COMPARATIVE EXAMPLE 8

"EPOKEY 830" as used in Example 15 (resin content 40%; 75 parts), "EPOKEY 834" as used in Example 8 (resin content 40%; 75 parts), "EPICLON H-353" (87.5 parts) and "PLYOPHEN TD-447" as used in Example 8 (resin content 50%; 8.3 parts) were combined into a solvent mixture of xylene, methyl isobutyl ketone, cellosolve acetate, butanol, cyclohexanone (2:1:1:1:1) (4.2 parts) to obtain a resin mixture.

The mixture (37.5 parts) and globular zinc powder (average particle size 4–5μ; 85 parts) were mixed together to make a coating composition, which was then applied to a steel plate and baked to form a coating film having a thickness of 13μ.

COMPARATIVE EXAMPLE 9

To zinc powder as used in Example 8 (10.0 parts). there was added a mixture of decaphenylheptakis(dipropylene glycol) octaphosphite (phosphorus contet 11.8%; 10 parts) and tributyl phosphite (phosphorus content 11.6%; 10 parts) in xylene (1.5 parts) to obtain a composition. The composition was taken into a 100 ml broad-necked glass bottle, glass beads (20 parts) was added thereto and the resultant mixture was dispersed with a paint mill for 10 minutes. Thereafter, the glass beads were removed to make a coating composition, which was then applied to a cold rolled steel plate by the use of a bar coater and baked at 300° C. for 3 minutes to form a coating film having a thickness of 5μ. In the resulting coating film, the organic phosphorus compounds were decreased due to decomposition so that the zinc content was 84%.

TEST EXAMPLE 2

Regarding the coating films obtained in Examples 7 to 12, 14, 15, 18 and 23 and Comparative Examples 6 and 9, the adhesion and the corrosion resistance were tested, and the results are shown in Table 3. As for the corrosion resistance, the coating films were previously cross-cut and subjected to the salt spray test (JIS K 5400-7.8). The evaluation was made on the abnormality at the cross-cut portion and the flat portion respectively after 120 and 240 hours according to the following criteria:

- ◉: No abnormality
- ○: Scarcely abnormal
- △: Considerably abnormal
- X: Remarkably abnormal As for the adhesion, the evaluation was made by the 2T bend test based on the following criteria:

- ◉: Scarce peeling off noticed
- ○: Slight peeling off noticed
- △: Considerable peeling off noticed
- X: Remarkable peeling off noticed Further, as the result of the welding test effected on the coating films obtained in Examples 23 and 24 wherein the total amount of the metallic powder (e.g. zinc or iron) were less used, it was found that the continuous welding of 2,000 points was possible and the welding property was not deteriorated at all.

TABLE 3

| | Components | | | Salt spray test | | | | 2T bend test |
|---|---|---|---|---|---|---|---|---|
| | Resin:organic phosphorus compound | Zinc powder PWC*2 | Additive | 120 hours | | 240 hours | | |
| | | | | Flat portion | Cross-cut portion | Flat portion | Cross-cut portion | |
| Example | | | | | | | | |
| 7 | 87:13 | 85 | — | ◉ | ◉ | ◉ | ○ | ○ |
| 8 | 75:25 | 86 | — | ◉ | ◉ | ◉ | ○ | ○ |
| 9 | 95:5 | 86 | — | ◉ | ◉ | ◉ | ○ | ○ |
| 10 | 60:40 | 86 | — | ◉ | ◉ | ◉ | ◉ | ○ |
| 11 | 45:55 | 86 | — | ◉ | ◉ | ◉ | ◉ | △ |
| 12 | 70:30 | 91 | — | ◉ | ◉ | ◉ | ◉ | △ |
| 14 | 50:50 | 80 | — | ◉ | ◉ | ◉ | △ | ○ |
| 15 | 90:10 | 85 | — | ◉ | ◉ | ◉ | ○ | ◉ |
| 18 | 77:23 | 86 | — | ◉ | ◉ | ◉ | ◉ | ◉ |
| 23 | 75:25 | 20 | Fe,50% | ◉ | ◉ | ◉ | ○ | ◉ |
| Comparative Example | | | | | | | | |
| 6 | 100:0 | 86 | — | X | X | X | X | △ |
| 9 | 0:100 | 84 | — | ◉ | ○ | ◉ | △ | X |
| Control*1 | — | — | — | X | X | X | X | — |

Note:
*1 Commercially available steel plate electroplated with zinc in an amount of 20 g/m² used.
*2 PWC: pigment weight concentration

What is claimed is:

1. A coating composition for a metal substrate which comprises (A) an epoxy resin, (B) an organic phosphorus compound, (C) zinc powder and (D) a magnesium compound dispersed in a liquid medium, the weight proportion of the components (A) and (B) being from 45:55 to 95:5, the content of the component (C) corresponding to from 30 to 95% by weight based on the total weight of the non-volatile components in the composition and the content of the component (D) being from 0.1 to 5% by weight based on the total weight of the non-volatile components in the composition.

2. The coating composition according to claim 1, wherein a portion of the component (C) is replaced by (E) an solid electroconductive material; the amount of the component (E) being not more than 3 parts by weight to one part by weight of the component (C).

* * * * *